United States Patent [19]

Henderson

[11] Patent Number: 4,947,250

[45] Date of Patent: Aug. 7, 1990

[54] NOISE REDUCTION APPARATUS FOR A WIDESCREEN VIDEO SIGNAL PROCESSING SYSTEM

[75] Inventor: John G. N. Henderson, Princeton, N.J.

[73] Assignee: General Electric Company, Princeton, N.J.

[21] Appl. No.: 404,024

[22] Filed: Sep. 7, 1989

[30] Foreign Application Priority Data

Nov. 11, 1988 [GB] United Kingdom ............... 8826465

[51] Int. Cl.$^5$ ................................. H04N 7/04
[52] U.S. Cl. .................................. 358/141; 358/12
[58] Field of Search ............... 358/11, 12, 36, 140, 358/141, 167

[56] References Cited

U.S. PATENT DOCUMENTS

| | | | |
|---|---|---|---|
| 4,816,899 | 5/1989 | Strolle et al. | 358/12 |
| 4,853,766 | 8/1989 | Isnardi et al. | 358/12 |
| 4,855,824 | 8/1989 | Fuhrer | 358/141 |
| 4,882,614 | 11/1989 | Kageyama et al. | 358/12 |

OTHER PUBLICATIONS

"Reliable EDTV/HDTV Transmission in Low-Quality Analog Channels"; by Schrieber et al; SMPTE Journal; Jul. 1989, pp. 496–503.

Philips Laboratories, "Decomposition and Recombination of a Wide Aspect Ratio Image for ENTSC Two-Channel Television"; by Cavallerno; IEEE Transactions on Consumer Electronics; Aug. 1987.

Primary Examiner—John W. Shepperd
Assistant Examiner—Michael D. Parker
Attorney, Agent, or Firm—Joseph S. Tripoli; Eric P. Herrmann; Ronald H. Kurdyla

[57] ABSTRACT

In a system for processing a widescreen television signal containing center and side panel components, low frequency side panel information is time compressed before being disposed in a horizontal image overscan region. The compressed side panel low frequency information is frequency modulated onto an FM subcarrier to improve the noise characteristics of the compressed side panel information when transmitted over a noisy channel.

7 Claims, 2 Drawing Sheets

– 1 –

NOISE REDUCTION APPARATUS FOR A WIDESCREEN VIDEO SIGNAL PROCESSING SYSTEM

BACKGROUND OF THE INVENTION

This invention concerns apparatus for improving the signal-to-noise characteristic of side panel information relative to center panel information in a widescreen television-type signal processing system.

U.S. Pat. No. 4,816,899—Strolle et al. discloses a widescreen television signal processing system wherein low frequency left and right side panel information, exclusive of high frequency side panel information, is encoded by time compressing such information into left and right horizontal image overscan regions. Specifically, in the case of the luminance signal, luminance information from DC to 700 KHz is time compressed approximately 6:1, resulting in a bandwidth of approximately 4.2 MHz. The receiver performs a complementary time expansion.

Because of the time compression and expansion during the encoding and decoding processes, the side panel low frequency component contains much more noise energy under noisy channel conditions than the same low frequency band of center panel information. This condition manifests itself as an objectionable difference in the noise characteristics of displayed center panel and side panel images. Specifically, side panel images exhibit horizontally "streaky" low frequency noise which contrasts with the broader bandwidth noise in the center panel image and which is more objectionable. Side panel information therefore appears visibly different from center panel information, particularly for transmission channels with signal-to-noise ratios below about 35 db.

SUMMARY OF THE INVENTION

To improve the signal-to-noise characteristic of the time compressed side panel low frequency information, compressed side panel low frequency video information is frequency modulated rather than amplitude modulated onto an auxiliary FM subcarrier prior to transmission.

DESCRIPTION OF THE DRAWINGS

In FIG. 1 a source of widescreen television signals 10 provides widescreen television color video components Y (luminance) and IQ (color difference) in digital form. Source 10 illustratively includes matrix, analog-to-digital converter and filtering circuits. The signals from source 10 are processed by a side-center panel signal separator 18 to produce three groups of output signals. Signal groups YC, IC, QC and YL, IL, QL respectively comprise center panel information, and low frequency side panel information exclusive of high frequency information. Signal group YH, IH and QH comprises high frequency side panel information exclusive of low frequency information. Signals YL, IL, QL and YC, IC, QC are eventually combined to produce a signal containing a center panel component with side panel low frequency information time compressed into left and right horizontal overscan regions. The combined signal is an NTSC compatible widescreen signal with a standard 4:3 display aspect ratio.

Figure 1:
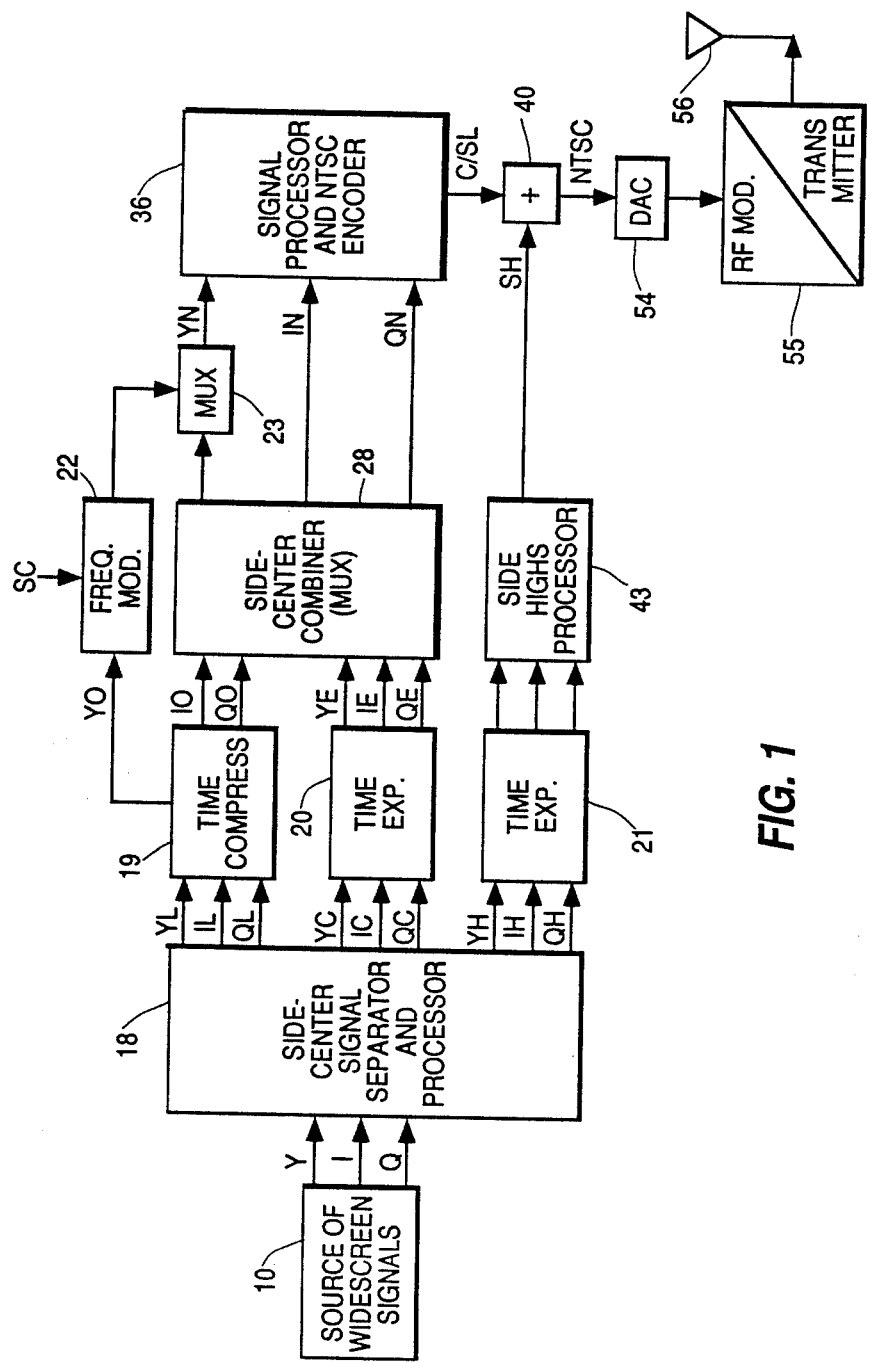
FIG. 1 shows a block diagram of a transmitter encoder portion of a widescreen television signal processing system including auxiliary signal modulating apparatus according to the invention.

More specifically, side panel lows components YL, IL, QL and center panel components YC, IC, QC are time compressed (6:1) and time expanded by units 19 and 20 respectively to produce signals YO, IO, QO and YE, IE, QE. Signals IO, QO and YE, IE, QE are combined by a side-center signal combines 28, e.g., a time multiplexer, to produce output signals which exhibit an NTSC compatible bandwidth and a standard 4:3 image aspect ratio, with time compressed low frequency left and right side panel information being disposed in left and right horizontal overscan regions on either side of the center panel region.

Time compressed luminance side panel low frequency information YO is low pass filtered to approximately 70 KHz before being subjected to a time compression of approximately 6:1 by unit 19. Signal YO therefore exhibits an increased bandwidth of about 420 KHz. Time compressed signal YO is provided to a frequency modulator 22 for frequency modulating an auxiliary subcarrier of 1.5 MHz in this example, resulting in an improved signal-to-noise ratio compared to amplitude modulation. The bandwidth of the modulating side lows component can be reduced to achieve improved signal-to-noise ratio at the expense of bandwidth.

In this example the 1.5 MHz FM subcarrier is permitted to deviate so that it occupies the available plus-or-minus 1.5 MHz bandwidth. A 10 db signal-to-noise improvement is obtained in accordance with Carson's rule as given by the expression $$10 \log(\Delta \beta^2),$$

where the deviation ($\Delta$) is 1.08 MHz (i.e., 1.5 MHz−0.42 MHz), and $\beta$ is 2.57 (i.e., 1.08 MHz/0.42 MHz).

For this widescreen television application the luminance signal, which contains a significant amount of image detail information, when contaminated by noise is considered to be subjectively more disturbing than a noise contaminated chrominance signal. The disclosed frequency modulated auxiliary subcarrier also could be used for conveying low frequency side panel chrominance information, depending upon the requirements of a particular system. If chrominance and luminance components are both modulated on the FM subcarrier, care should be taken to prevent significant interference between the auxiliary subcarrier and the chrominance subcarrier.

A time multiplexer 23 responds to the modulated time compressed side panel lows signal from frequency modulator 22 and to the luminance output signal from unit 22 containing center panel luminance information and frequency modulated side panel lows information. Multiplexer 23 inserts the center panel luminance information into the prescribed center panel time interval between the left and right side panel time intervals occupied by the modulated left and right side panel low frequency information. The output signal from multiplexer 23 is a luminance signal YN, which is provided to an input of a signal processor and NTSC encoder 36. Other inputs of encoder 36 receive chrominance signals YN and QN. Unit 36 processes signals YN, IN and QN to develop an NTSC compatible composite output signal C/SL containing center panel information with side panel low frequency information compressed into horizontal overscan regions. Unit 36 includes luminance and chrominance filters, a chrominance modulator, and conventional NTSC encoding circuits for encoding luminance and chrominance information.

Side panel high frequency components YH, IH and QH are time expanded by networks associated with a unit 21 before being applied to a side highs processor 43. In unit 43 the time expanded side panel high frequency information amplitude modulates an auxiliary suppressed subcarrier with a phase that reverses at the field rate. The modulated subcarrier is subjected to amplitude compression and bandpass filtering to develop a side panel highs signal SH. This signal is combined with signal C/SL in a combiner 40 to produce a widescreen compatible composite signal NTSC. Signal NTSC is converted to analog form by a digital-to-analog converter (DAC) 54 before being applied to an RF modulator and transmitter network 55 for broadcast via an antenna 56.

With the exception of the manner in which signal YO is processed by means of units 22 and 23, the system of FIG. 1 is disclosed in greater detail in U.S. Pat. No. 4,819,899—Strolle et al. The described auxiliary signal frequency modulated with side panel low frequency information can be similarly situated in an enhanced image definition version of the illustrated widescreen encoder system. Such an enhanced definition system is disclosed in a copending U.S. patent application Ser. No. 139,339 of J. S. Fuhrer titled "Compatible Television System with Companding of Auxiliary Signal Encoding Information".

Figure 2:
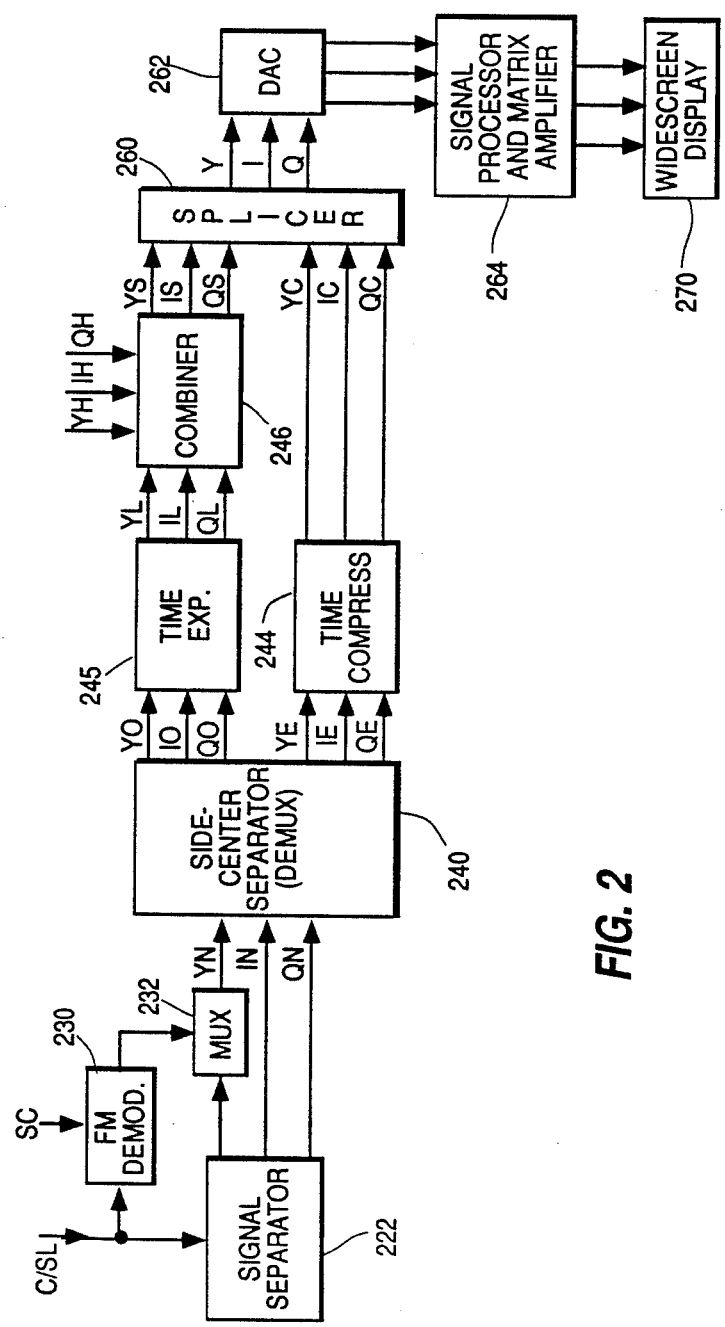
FIG. 2 is a block diagram of a portion of a widescreen television receiver employing auxiliary signal demodulating apparatus according to the present invention.

FIG. 2 depicts a block diagram of a widescreen receiver decoder for the compatible widescreen television signal developed by the transmitter encoder of FIG. 1. The system of FIG. 2 is disclosed in greater detail in the Strolle et al. patent, with the exception of the auxiliary signal FM demodulator apparatus as will be discussed below.

Recovered NTSC compatible composite center/side panel signal C/SL is applied to a signal separator 222 and to an FM demodulator 230 responsive to a 1.5 MHz reference signal SC. A demodulated time compressed side panel luminance low frequency component is provided by FM demodulator 230 to one input of a time multiplexer 232, another input of which receives a signal from the luminance output of signal separator 222 containing center panel luminance information and frequency modulated side panel lows information. Multiplexer 232 inserts the center panel luminance information into the prescribed center panel time interval between the left and right time intervals occupied by demodulated left and right side panel low frequency information from demodulator 230. The output signal from multiplexer 230 constitutes NTSC compatible luminance signal YN. FM demodulator 230 can be of the type described in U.S. Pat. No. 4,547,737 of J. J. Gibson.

Luminance signal YN and chrominance signals IN, QN from separator 222 are applied to inputs of a side-center signal separator 240 (e.g., a de-multiplexer) for producing separated low frequency side panel luminance and chrominance components YO, IO, QO, and center panel luminance and chrominance components YE, IE, QE. Signals YE, IE, QE are time compressed by unit 244 to produce signals YC, IC, QC which occupy the prescribed center panel display area. Signals YO, IO and QO are time expanded by a unit 245 to produce low frequency side panel signals YL, IL and QL. These signals are combined in a unit 246 with recovered side panel high frequency components YH, IH and QH to produce side panel luminance and chrominance signals YS, IS and QS. Reconstructed side panel signals YS, IS, QS are spliced to reconstructed center panel signals YC, IC, QC by means of a splicer 260 to form a fully reconstructed widescreen signal containing components Y, I and Q.

Widescreen signals Y, I, Q are converted to analog form by means of a digital-to-analog converter (DAC) 262 before being applied to a video signal processor and matrix amplifier 264. The video signal processor component of unit 264 includes signal amplifying, DC level shifting, peaking, brightness control, contrast control and other video signal processing circuits of a conventional nature. Matrix amplifier 264 combines luminance signal Y with color difference signals I and Q to produce color image representative video signals R, G and B. These color signals are amplified by display driver amplifiers in unit 264 to a level suitable for directly driving a widescreen color image display device 270, e.g., a widescreen kinescope.

What is claimed is:
1. Video signal encoding apparatus comprising:
    means for providing a television type signal representative of a widescreen image having side panel information, main panel information and an image aspect ratio greater than that of a standard television image; and
    means for frequency modulating an auxiliary subcarrier with said side panel information.
2. Apparatus according on claim 1, wherein
    said modulating side panel information is low frequency side panel information exclusive of high frequency side panel information.
3. Apparatus according to claim 1 and further comprising:
    means for time compressing said side panel information prior to modulating said auxiliary subcarrier.
4. Apparatus for decoding an encoded widescreen video signal representative of a widescreen image having an image aspect ratio greater than a standard aspect ratio, a side panel component and a main panel component, said side panel component frequency modulating an auxiliary subcarrier, said apparatus comprising:
    means for frequency demodulating said auxiliary subcarrier to recover said side panel component; and
    means for combining said recovered side panel component with said main panel component.
5. Apparatus according to claim 4 and further comprising:
    means for time expanding said recovered side panel component prior to combining said recovered side panel component with said main panel component.
6. Apparatus according to claim 4, wherein
    said side panel component modulating said auxiliary subcarrier contains low frequency side panel information exclusive of high frequency side panel information.
7. Apparatus according to claim 6, wherein said modulating side panel component is a luminance side panel component.

* * * * *